(12) United States Patent
Kostiainen et al.

(10) Patent No.: US 10,637,661 B2
(45) Date of Patent: Apr. 28, 2020

(54) SYSTEM FOR USER-FRIENDLY ACCESS CONTROL SETUP USING A PROTECTED SETUP

(71) Applicant: Conversant Wireless Licensing S.a r.l., Luxembourg (LU)

(72) Inventors: Kari Timo Juhani Kostiainen, Helsinki (FI); Seamus Peter Moloney, Riihimaki (FI); Olli Antero Rantapuska, Vantaa (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 1 day.

(21) Appl. No.: 15/996,972

(22) Filed: Jun. 4, 2018

(65) Prior Publication Data

US 2019/0020638 A1    Jan. 17, 2019

Related U.S. Application Data

(63) Continuation of application No. 14/623,142, filed on Feb. 16, 2015, now Pat. No. 10,027,638, which is a continuation of application No. 11/646,277, filed on Dec. 28, 2006, now Pat. No. 8,984,279.

(60) Provisional application No. 60/873,256, filed on Dec. 7, 2006.

(51) Int. Cl.
*H04L 9/08* (2006.01)
*H04L 9/32* (2006.01)
*H04L 29/06* (2006.01)

(52) U.S. Cl.
CPC .............. *H04L 9/0861* (2013.01); *H04L 9/32* (2013.01); *H04L 9/3226* (2013.01); *H04L 63/0435* (2013.01); *H04L 63/06* (2013.01); *H04L 63/061* (2013.01); *H04L 63/0815* (2013.01); *H04L 2209/80* (2013.01)

(58) Field of Classification Search
None
See application file for complete search history.

(56) References Cited

U.S. PATENT DOCUMENTS

| | | |
|---|---|---|
| 6,321,270 B1 | 11/2001 | Crawley |
| 6,611,194 B1 | 8/2003 | Vieweg et al. |
| 8,984,279 B2 | 3/2015 | Kostiainen et al. |

(Continued)

*Primary Examiner* — Benjamin E Lanier
(74) *Attorney, Agent, or Firm* — Conversant Wireless Licensing

(57) ABSTRACT

A method and apparatus includes a determining unit configured to determine whether a device entering a network should be allowed access and an executing unit configured to execute a configuration protocol between the registrar and the device and to a shared unique configuration key between the registrar and the device. If the device provides a privileged service, the configuration protocol enables the device to advertise the privileged service or if the device is a control point, the configuration protocol enables the device to advertise that it is able to control certain privileged services. The registrar also includes a controlling unit configured to obtain a controller key, if the registrar is to become controller of the new device and a service unit configured to execute a credential service that allows devices providing privileged services to delegate issuing of access control credentials to the registrar, wherein other devices may use the credential service to obtain credentials for privileged services.

20 Claims, 4 Drawing Sheets

(56) References Cited

U.S. PATENT DOCUMENTS

| | | | |
|---|---|---|---|
| 2002/0083014 A1* | 6/2002 | Brickell | G06Q 10/10 |
| | | | 705/76 |
| 2003/0174844 A1 | 9/2003 | Candelore | |
| 2005/0188193 A1* | 8/2005 | Kuehnel | G06F 21/445 |
| | | | 713/155 |
| 2005/0283618 A1* | 12/2005 | Min | H04L 63/083 |
| | | | 713/182 |
| 2006/0101270 A1 | 5/2006 | Laitinen | |
| 2006/0156388 A1 | 7/2006 | Stirbu et al. | |
| 2006/0168219 A1* | 7/2006 | Ahluwalia | H04L 67/16 |
| | | | 709/225 |
| 2006/0190601 A1* | 8/2006 | Lee | H04L 63/0892 |
| | | | 709/225 |
| 2007/0079362 A1 | 4/2007 | Lortz et al. | |
| 2007/0086590 A1 | 4/2007 | Blom | |
| 2007/0150720 A1 | 6/2007 | Oh et al. | |
| 2008/0095374 A1 | 4/2008 | Schreyer | |
| 2015/0163208 A1 | 6/2015 | Kostiainen et al. | |

* cited by examiner

SYSTEM FOR USER-FRIENDLY ACCESS CONTROL SETUP USING A PROTECTED SETUP

CROSS-REFERENCE TO RELATED APPLICATION

This application is a continuation of U.S. application Ser. No. 14/623,142 filed on Feb. 16, 2015, which is a continuation of U.S. application Ser. No. 11/646,277 filed on Dec. 28, 2006 now U.S. Pat. No. 8,984,279, which claims priority of U.S. Provisional Patent Application No. 60/873,256, filed on Dec. 7, 2006. The subject matter of the earlier filed applications is hereby incorporated by reference.

BACKGROUND OF THE INVENTION

Field of the Invention

The present invention relates to method and apparatus for allowing user-friendly access control setup for Universal Plug and Play networks.

Description of the Related Art

Universal Plug and Play networking technology defines an architecture for peer-to-peer network connectivity of intelligent appliances, such as, wireless devices, and personal computers. It is designed to bring easy-to-use, flexible, standards-based connectivity to ad-hoc or unmanaged public or private networks. It also provides a distributed, open networking architecture that leverages TCP/IP and Web technologies to enable seamless proximity networking, in addition to, control and data transfer among networked devices. Hence, Universal Plug and Play Device Architecture (UDA) is designed to support zero-configuration networking and automatic discovery of device categories from a wide range of vendors. UDA, thus, enables a device to dynamically join a network, obtain an IP address, convey its capabilities, and learn about the presence and capabilities of other devices.

Universal Plug and Play forum has specified standards for many kinds of services, for example, for audio/visual equipment, home automation, printing and Wide Area Network connectivity. Thus, standardised interfaces can be implemented by device manufacturers to allow their devices to be controlled and used by other devices. Universal Plug and Play security offers a way to achieve security for device authentication, command authorization and encrypted actions for Universal Plug and Play services. In theory, Universal Plug and Play security enables one to define device-specific access control. Specifically, Universal Plug and Play security defines a security console, where a device is used to "take ownership" of other devices. Once the security console has taken ownership of a device, it can define which devices are allowed to use the services provided by this device.

Although Universal Plug and Play security has been standardized, it has not been accepted by the industry. The main reason has been the complexity of the security standard and the fact that Universal Plug and Play networks are typically simple and, therefore, lack the need for this kind of complex security. Specifically, taking ownership of a device requires that a user reads a public key hash of a target device and compares the public key hash to a hash shown on a screen of the security console device. Reading and comparing full length hashes is very error-prone and inconvenient for the user. Although the Universal Plug and Play security standard allows the user to attach a USB cable between two devices to avoid requiring the user to read and compare full length hashes, this approach is also not user-friendly.

Wireless Fidelity (WiFi) devices which may be used in a Universal Plug and Play network are certified, by the WiFi Alliance, as interoperable with each other, even if they are from different manufacturers. Specifically, a WiFi Protected Setup protocol has been specified by the WiFi Alliance as an interoperability standard which describes how wireless Local Area Networks (LAN) can be set up and how new devices can be added to these networks in a secure and user-friendly fashion. The WiFi Protected Setup protocol includes an Application Extension Mechanism which enables bootstrapping of application-level shared secrets from link layer security keys that are securely distributed as a part of the WiFi Protected Setup.

In a "smart" home, there is typically a secured wireless network with many interconnected devices. Some of the devices provide services that other devices can use. By nature, some privileged services, such as controlling a home automation system or accessing personal documents, are private or confidential. Thus, the person controlling the home network should be able to define which devices (or more precisely, which "control point" devices) are allowed to access these privileged services. The operation of defining the access control rules for different devices and services should be as user-friendly as possible, since it will likely be performed by average consumers instead of network administration professionals.

However, there is currently no user-friendly solution for defining access control rules for a Universal Plug and Play network or any other type of home network. Although Universal Plug and Play security was designed for this, as noted previously, it has serious shortcomings. One inherent problem in a user-friendly access control setup is that security associations (either shared secrets, authenticated public keys or mutually trusted certificates) must be somehow established between the devices at hand. Since in a home environment there are no trusted authorities, the user has to do this bootstrapping of security associations. Typically, this means that the user has to either manually configure shared keys between devices or enter PIN codes to devices.

None of the current security standards allows a single action operation in which a new user is granted network access in addition to the set of needed access rights to the individual devices in the network. This makes for a clumsy and error-prone user experience where, for example, one PIN code is needed in order to provide the user with a WLAN key, another PIN code is needed for issuing the user with the rights associated with use of a particular Universal Plug and Play media server device and yet another PIN code needed to grant the user access to an automation device, such as a climate control device. Therefore, no current mechanism makes it possible for a device joining the network to be provided with all the needed security keys in one simple interaction.

SUMMARY OF THE INVENTION

The present invention relates to a registrar including a determining unit configured to determine whether a device entering a network should be allowed access and an executing unit configured to execute a configuration protocol between the registrar and the device and to share a unique configuration key between the registrar and the device. If the device provides a privileged service, the configuration protocol enables the device to advertise the privileged service or if the device is a control point, the configuration protocol enables the device to advertise that it is able to control certain privileged services. The registrar also includes a controlling unit configured to obtain a controller key, if the user of the registrar is to become the controller of the new device providing privileged services and a service unit configured to execute a credential service that allows devices providing privileged services to delegate access control credentials issuing rights to the registrar, wherein control point devices may use the credential service to obtain access control credentials for privileged services.

The invention also relates to a device including a requesting unit configured to request entry to a network and an executing unit configured to execute a configuration protocol between a registrar of the network and the device and to share a unique configuration key between the registrar and the device. If the device provides a privileged service, the configuration protocol enables the device to advertise the privileged service or if the device is a control point, the configuration protocol enables the device to advertise that it is able to control certain privileged services. The device also includes a controller unit configured to obtain a controller key, if the user of the registrar device is to become the controller of the device. The device further includes an access unit configured to access a credential service that allows devices providing privileged services to delegate access control credentials issuing rights to the registrar and a subscription unit configured to subscribe to events from the credential service, wherein the events are issued when service keys have been obtained by the registrar and control points that have been granted access to privileged services.

The invention also relates to a registrar apparatus including determining means for determining whether a device entering a network should be allowed access and executing means for executing a configuration protocol between the registrar apparatus and the device and sharing a unique configuration key between the registrar apparatus and the device. If the device provides a privileged service, the configuration protocol enables the device to advertise the privileged service or if the device is a control point, the configuration protocol enables the device to advertise that it is able to control certain privileged services. The registrar apparatus also includes obtaining means for obtaining a controller key, if the user of the registrar apparatus is to become the controller of the new device and executing means for executing a credential service that allows devices providing privileged services to delegate access control credentials issuing rights to the registrar, wherein other devices may use the credential service to obtain access control credentials for privileged services.

The invention also relates to an apparatus including requesting means for requesting entry to a network by the apparatus and executing a configuration protocol between a registrar of the network and the apparatus and sharing a unique configuration key between the registrar and the apparatus. If the apparatus provides a privileged service, the configuration protocol enables the apparatus to advertise the privileged service or if the apparatus is a control point, the configuration protocol enables the apparatus to advertise that it is able to control certain privileged services. The apparatus also includes obtaining means for obtaining a controller key, if the user of the registrar is to become the controller of the apparatus and accessing means for accessing a credential service that allows devices providing privileged services to delegate access control credentials issuing rights to the registrar. The apparatus further includes subscribing means for subscribing to events from the credential service, wherein the events are issued when service keys have been obtained by the registrar and control points that have been granted access to privileged services.

The invention also relates to a method including requesting entry to a network by a device and executing a configuration protocol between a registrar of the network and the device and sharing a unique configuration key between the registrar and the device. If the device provides a privileged service, the configuration protocol enables the device to advertise the privileged service or if the device is a control point, the configuration protocol enables the device to advertise that it is able to control certain privileged services. The method also includes obtaining a controller key, if the user of the registrar is to become the controller of the device. Furthermore the method includes accessing a credential service that allows devices providing privileged services to delegate access control credentials issuing rights to the registrar and subscribing to events from the credential service, wherein the events are issued when service keys have been issued by the registrar and control points that have been granted access to privileged services.

The invention also relates to a method including determining whether a device entering a network should be allowed access and executing a configuration protocol between a registrar and the device and sharing a unique configuration key between the registrar and the device. If the device provides a privileged service, the configuration protocol enables the device to advertise the privileged service or if the device is a control point, the configuration protocol enables the device to advertise that it is able to control certain privileged services. The method also includes obtaining a controller key, if the user of the registrar is to become the controller of the new device and executing a credential service that allows devices providing privileged services to delegate access control credentials issuing rights to the registrar, wherein other devices may use the credential service to obtain access control credentials for privileged services.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings. The present invention provides a method and apparatus which allows user-friendly access control setup for Universal Plug and Play networks.

Figure 1:
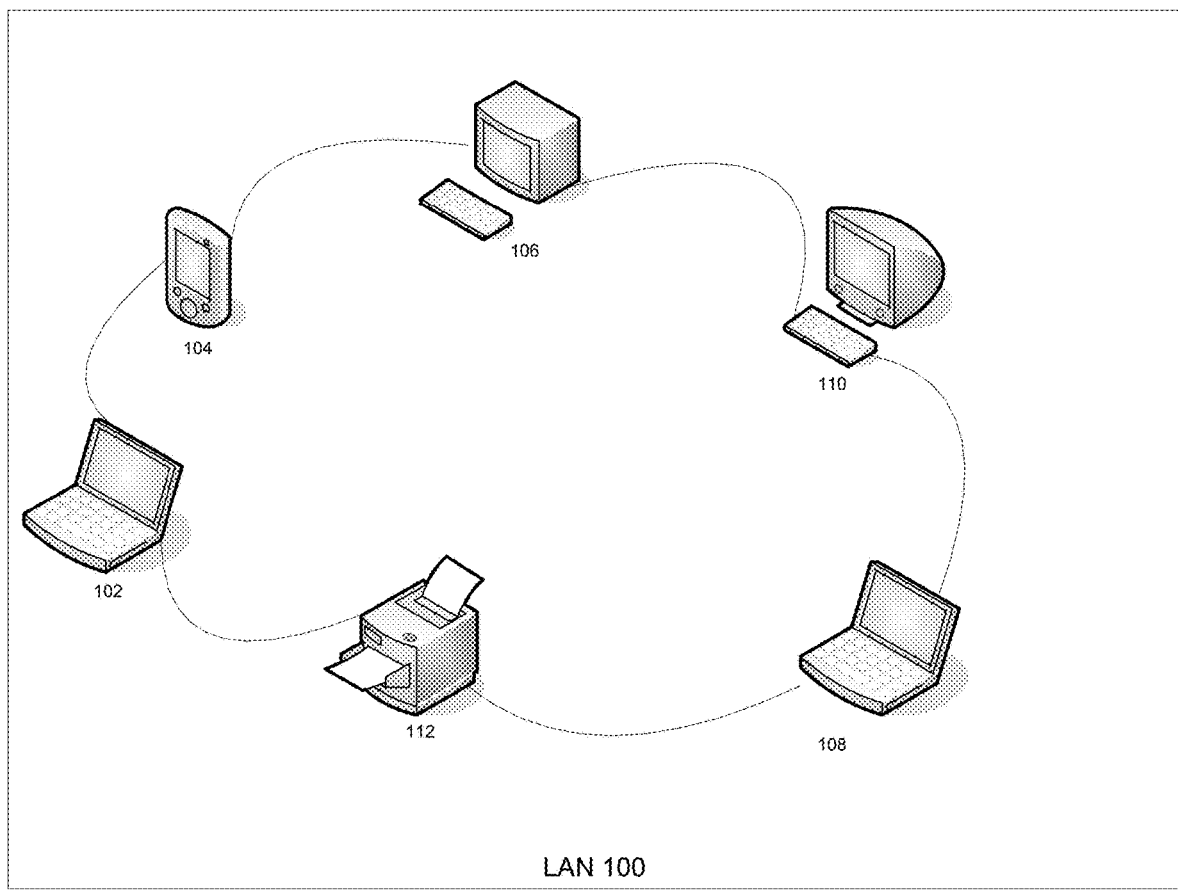
FIG. 1 illustrates an embodiment of Universal Plug and Play network.

FIG. 1 illustrates a Universal Plug and Play local area network (LAN) 100 that may be used to implement an embodiment of the present invention. LAN 100 includes devices 102-110, and peripherals, such as printers and other devices 112 that may be shared by devices on LAN 100. Devices 102-110 may be computer systems that may serve as clients and/or servers for each other and/or for other devices connected to LAN 100. Other quantities or combinations of devices may be used in other embodiments of the invention. Devices on LAN 100 may be connected together by cable media, for example, copper or fiber-optic cable and the network topology may be a token ring topology. It should be apparent to those of ordinary skill in the art that other media, for example, wireless media may also connect LAN 100 devices. It should also be apparent that other network topologies, such as Ethernet, may be used.

According to an embodiment of the invention, LAN 100 may be connected to the Internet and may be connected to other LANs or Wide Area Networks (WAN). Hence, some devices of LAN 100 may be web-enabled. The computer processors used to execute the inventive system and method, for example computer systems 102, 104, 106, 108 and 110, include electronic storage media, such as disks, for storing programming code and data structures used to implement the inventive method and outputs therefrom. For illustrative purposes, an embodiment of the invention uses applications executed on computer systems 102-108 to implement the invention described herein. Note, however, that any number of computer systems may be configured to implement the inventive method and those computer systems 102-108 are only used for exemplary purposes.

Figure 2:
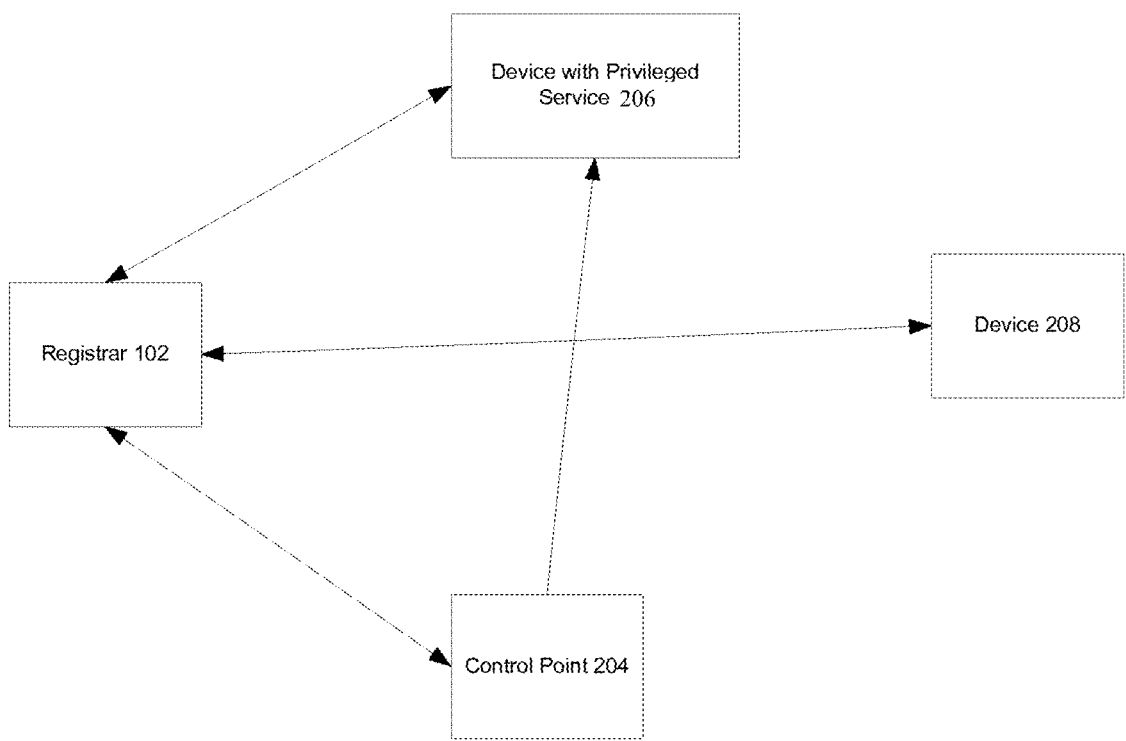
FIG. 2 illustrates elements of the Universal Plug and Play network.

FIG. 2 illustrates an embodiment of the present invention using a WiFi Protected Setup protocol. The WiFi Protected Setup protocol enables devices 202-208, which correspond with devices 102-108, to be provisioned with Wireless LAN (WLAN) credentials in a user-friendly fashion. As shown in FIG. 2, a registrar 202, for example on system 102, which currently exists on LAN 100, which may be a home network, is used by a WLAN access point to query a user of registrar 202. The query relates to whether a newly entered device, for example device 208 which is associated with system 108, should be allowed to use the network and relates to authenticating this new device 208. The query and other interaction between the user and registrar 202 may be performed on a graphical user interface associated with registrar 202. In an embodiment, the user of registrar 202 enters a PIN code of new device 208 into registrar 202 in order to grant network access for device 208. The user may obtain the PIN code, for example, from a printed label attached to the device 208 or from a display of the device 208.

After the user has entered the PIN code, registrar 202 and device 208, run a SimpleConfig protocol which is authenticated using the PIN. Thereafter, registrar 202 and device 208 share a SimpleConfig key. When another new device, for example device 206 associated with system 106, which provides privileged services joins the secured wireless network, the SimpleConfig protocol is executed so that device 206 can advertise in the SimpleConfig protocol that it provides privileged services. After the SimpleConfig protocol is completed and device 206 has established a SimpleConfig key with registrar 202, registrar 202 may inquire if an associated user wants to become the controller of device 206. If the user provides an affirmative response, a controller key is derived from the SimpleConfig key using a mathematical algorithm, for example one using a pseudo random function based on keyed hashing using the SHA-256 hashing algorithm. An embodiment of the invention uses the Application Extension Mechanism of Protected Setup for derivation of the controller key. In an embodiment of the invention, the user of registrar 202 may be asked if the user wants to become the controller of device 206 at the time of execution of the SimpleConfig protocol between device 206 and registrar 202.

Thereafter, when a new control point, for example device 204 which is associated with system 104, joins the network, control point 204 executes the SimpleConfig protocol with registrar 202 in order to obtain the needed WLAN credentials for control point 204. During execution of the SimpleConfig protocol, control point 204 may advertise that it is able to control certain privileged services. For example, a technically proficient user of device 204 might indicate that the user wishes to act as the administrator for a media server which is running in the network and so would request access to the privileged services running on the media server. If registrar device 202 is the controller of one or more of the privileged services requested by device 204, registrar 202 may require user input as to whether control point 204 should be given access to these privileged services. If the user of registrar device 202 responds in the affirmative, new service keys for the privileged services are derived at both device 204 and registrar 202 from the SimpleConfig key.

Therefore, registrar 202 and control point 204 may share service keys for each privileged service. Registrar 202 may send these service keys to device 206 providing the privileged services, wherein the transmitted service keys may be protected with the controller key during transmission. At this point, control point 204 and device 206 also have the shared service keys. Control point 204 may now start using any of the services provided by device 206 by using the proper service key. The communication between devices 204 and 206 can be encrypted and authenticated using the shared service key. It should be noted that the privileged services may only be used with a service key provided by the controller. Therefore, other control points in the network cannot use privileged services unless the user associated with the controller has granted them access rights.

An embodiment of the present invention enables registrar device 202 to become a centralised key management device, i.e. a controller, for the whole home network. Registrar 202 runs a CredentialIssuerService service which is a Universal Plug and Play service that allows devices providing privileged services to delegate the access control credentials to controller device 202. In this embodiment, a control point, for example device 204, may use the CredentialIssuerService to get credentials to privileged services.

Specifically, in order to implement the invention, devices on the network must become aware that the CredentialIssuerService is available on the network. So, registrar 202 indicates that it supports CredentialIssuerService by sending service advertisements over Internet Protocol (IP) that is a using Simple Service Discovery Protocol. Alternatively, registrar 202 indicates that it supports CredentialIssuerService by using the Application Extension Mechanism of the WiFi Protected Setup protocol. In this case, extra information is added into the payload of the SimpleConfig messages sent to WLAN devices. This information includes a unique identifier for the CredentialIssuerService (a UUID) and optionally the IP address of the device on the network where the CredentialIssuerService is running. The information can be sent in probe response where WLAN devices using active scanning can determine whether the service they are interested in is being offered by the WLAN network. However, in the WiFi Protected Setup protocol it is typical that the Application Extension Mechanism is used in such a way that the UUID of the CredentialIssuerService is added into the payload of the final message of the SimpleConfig exchange.

Communication between the controller, in this example registrar 202, running the CredentialIssuerService and the Universal Plug and Play devices in the home network needs to be secure. If it is not, the keys issued by the controller are of little value. SimpleConfig, the protocol of WiFi Protected Setup, offers a way to achieve a shared secret configuration key between the controller and the Universal Plug and Play devices that are to be managed. When a Universal Plug and Play device needs to be managed, the SimpleConfig protocol may be executed between the controller and the device. As noted above, the SimpleConfig protocol may be executed when the device is added to the network. Alternatively, the SimpleConfig protocol may be executed at a later time when a user triggers execution of the SimpleConfig protocol. The user may trigger execution of the SimpleConfig protocol by, for example, interacting with a graphical user interface of the controller to view the list of devices in the network and to select a target device. In either case, the output is a unique and shared secret control key between the Universal Plug and Play device and the controller which is known only to these two devices.

The Universal Plug and Play device, in this example device 206, with privileged services includes a control point for the CredentialIssuerService and it uses the controller key to access the CredentialIssuerService. The control point in device 206 needs to do two things to begin using the CredentialIssuerService. First, it needs to let the controller device 202 know what privileged services it is running and which the controller device 202 should advertise as being controlled. For example, device 206 may provide the service type, as defined in Universal Plug and Play forum, the IP address it is running on, the UUID of the service. These details are then communicated from controller device 202 to the control points 204 that wish to use the privileged services. Note that this is a secure call, wherein the shared controller key derived from the SimpleConfig key is used to authenticate the call and a MessageCounter of the CredentialIssuerService is used to prevent replay attacks. The Service UUID should be the same as that used in the run of SimpleConfig. The input authenticator used can be of the same format as that specified in SimpleConfig. For example, the authentication of the input parameter may use the first 8 bytes of a SHA-256-HMAC made using the shared controller key to sign the concatenation of the service name and service Uniform Resource Identifier (URI). Second, the control point in device 206 should subscribe to receive events from the CredentialIssuerService. These events are issued later when service keys have been distributed to control points that have been granted rights to use the privileged services.

When a privileged service has registered with the controller, it can be advertised as a service present on the home network to all devices wishing to join the network. This is done by the controller, i.e. registrar 202, by including the privileged service in the list of applications advertised in the SimpleConfig message exchange. This list and how it is used are referred to in the SimpleConfig specification as the Application Extension Mechanism. No changes are required to this mechanism in order to support advertising the new service, despite the fact that the privileged service is running on a device external to the registrar. The SimpleConfig specification allows the list to include service related data as well as the service UUID. Thus, a joining WLAN device with an interest in using some privileged service(s) of the network can obtain all the information it needs from the SimpleConfig message exchange. Using the shared key generated by the SimpleConfig exchange with registrar device 202, the new device can derive a key which will later be used for accessing that service and also for retrieving the information it needs to find the service, namely the Service URI.

Once the SimpleConfig exchange has run to completion, a service key for the privileged service is agreed upon between controller 202 and the new device, for example device 204 with a control point. Device 206 running the privileged service must now be informed about the issued service key. This is achieved by controller 202 setting an "evented" state variable, ServiceKeyIssued, to the value of the Universal Plug and Play service type for which the key has just been issued. When all subscribed privileged services on the network are "evented" and there has been a key issued, one can check from the value of the variable whether the new key was issued for the service which is being executed. If the new key has been issued for the executed service, an action on the CredentialIssuerService may be invoked.

The caller of this action may be the device running the privileged service. The caller specifies the Service UUID in order for controller 202 to know which control key it should use when checking the input authenticator and also when generating the response. The same control key may be used to make both input and output authenticators. The issued service key is encrypted using the control key. On decrypting the key, the privileged service knows that it should expect a client to attempt to use that key soon. In an embodiment, it is possible for the UUID of the control point 204 to whom that key was issued by the registrar 202 to be transmitted along with the issued service key so the privileged service device 206 can easily verify the issued service key is being used by the right device.

By this stage, the service key itself is a symmetric key shared between the new control point device 204 and the privileged service device 206. There are many ways in which the key itself could be used, depending on the service being accessed. For example, it could be that message authenticators are used to indicate knowledge of the service key and thus have the right to execute the privileged actions. However, there may be other ways of using the shared secret. Note that control point 204 might actually generate several service keys during the execution of SimpleConfig protocol with controller 202 and so control point 204 should be able to keep track of which service key to use for a particular service network.

An example of a scenario which an embodiment of the invention may be implemented is that there are a set of configured Universal Plug and Play control points in a network and that a new device providing privileged services, for example a new media server, is introduced to the network. This can mean that there is an existing set of possible administrative devices in the network. So, one or more of these administrative devices can be selected as the administrator for the new media server and provided with the credentials needed to invoke privileged operations on the new media server. By indicating, by the registrar, that CredentialIssuerService is supported and providing a mechanism where the Universal Plug and Play media server can sign up to the controller in a secured manner, the present invention ensures that the registrar/controller becomes aware of and starts to advertise that the new media server is on the network.

Thereafter, the SimpleConfig protocol can provide a number of ways for the controller 202 to issue keys to control points, for example on systems 104-110, upon requests by these control points. The Wifi Protected Setup standard specifies that devices which support SimpleConfig enrollment can run a Universal Plug and Play service called WFA WLANConfigService which is intended to be used for provisioning wireless credentials over Universal Plug and Play, as opposed to over Extensible Authentication Protocol. When the WFA WLANConfigService service is running on the SimpleConfig Enrollee, it is possible for the user to initiate a SimpleConfig exchange between a selected Universal Plug and Play control point and controller 202 by means of the controller displaying a list of available "possible" administrator control points. Alternatively, the user may initiate a SimpleConfig exchange with the controller directly from the Universal Plug and Play control point selected by the user to be the administrator. The resulting SimpleConfig exchange may then be used to distribute the service keys as described above.

Figure 3:
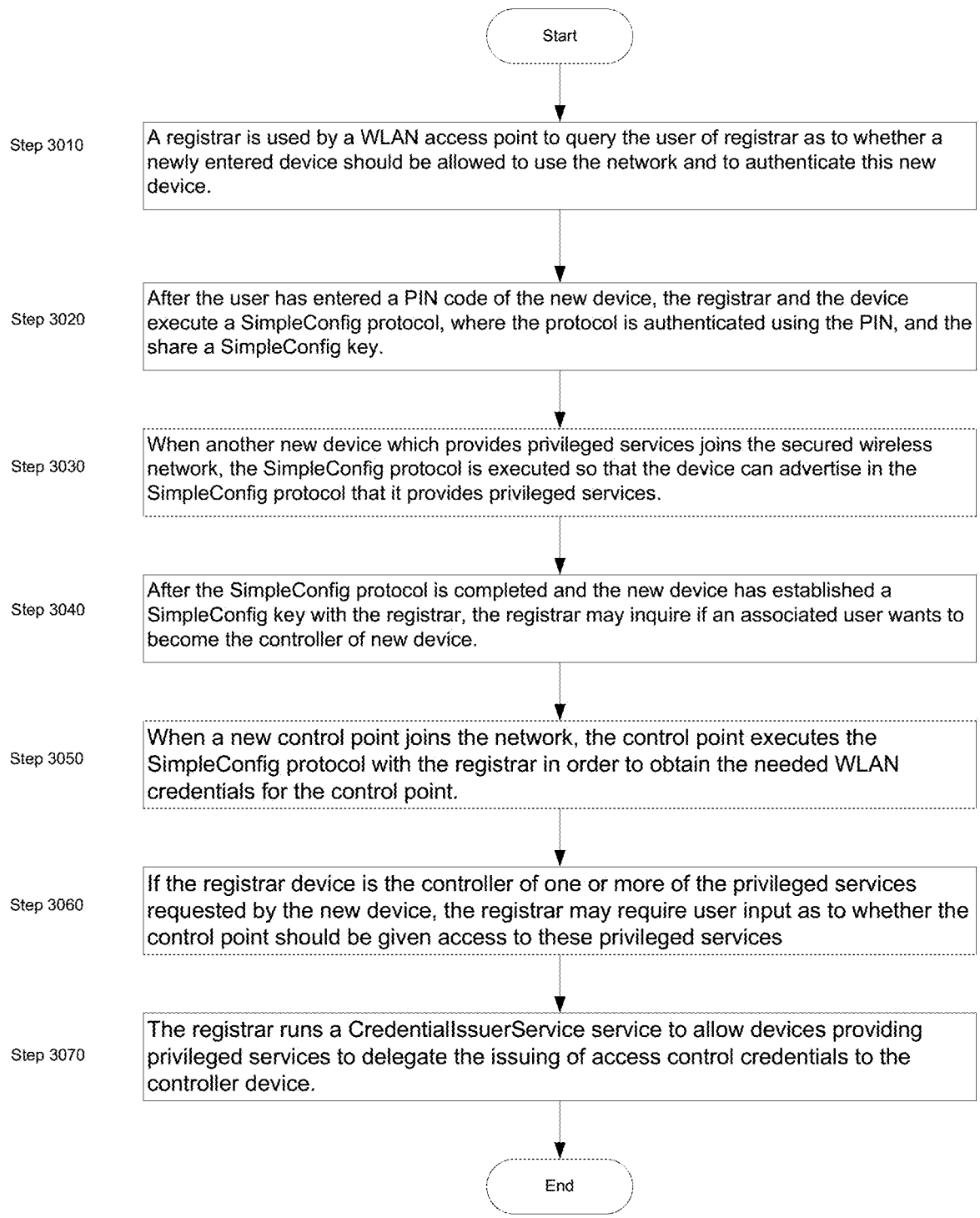
FIG. 3 illustrates steps implemented in an embodiment of the invention by a registrar.

FIG. 3 illustrates the steps implemented in embodiments of the invention. In Step 3010, a registrar 202 is used by a WLAN access point to query the user of registrar 202 as to whether a newly entered device should be allowed to use the network and to authenticate this new device 208. In Step 3020, after the user has entered a PIN code of the new device, registrar 202 and device 208 execute a SimpleConfig protocol, where the protocol is authenticated using the PIN. Thereafter, registrar 202 and device 208 share a SimpleConfig key. In Step 3030, when another new device 206 which provides privileged services joins the secured wireless network, the SimpleConfig protocol is executed so that device 206 can advertise in the SimpleConfig protocol that it provides privileged services. In Step 3040, after the SimpleConfig protocol is completed and device 206 has established a SimpleConfig key with registrar 202, registrar 202 may inquire if an associated user wants to become the controller of device 206. If the user provides an affirmative response, a controller key is derived from the SimpleConfig key. In Step 3050, when a new control point 204 joins the network, control point 204 executes the SimpleConfig protocol with registrar 202 in order to obtain the needed WLAN credentials for control point 204. During execution of the SimpleConfig protocol, control point 204 may advertise that it is able to control certain privileged services. In Step 3060, if registrar device 202 is the controller of one or more of the privileged services requested by device 204, registrar 202 may require user input as to whether control point 204 should be given access to these privileged services. If the user of registrar device 202 responds in the affirmative, new service keys for the privileged services are derived at both device 204 and registrar 202 from the SimpleConfig key. In Step 3070, registrar 202 runs a CredentialIssuerService service to allow devices providing privileged services to delegate the issuing of access control credentials to controller device 202.

Figure 4:
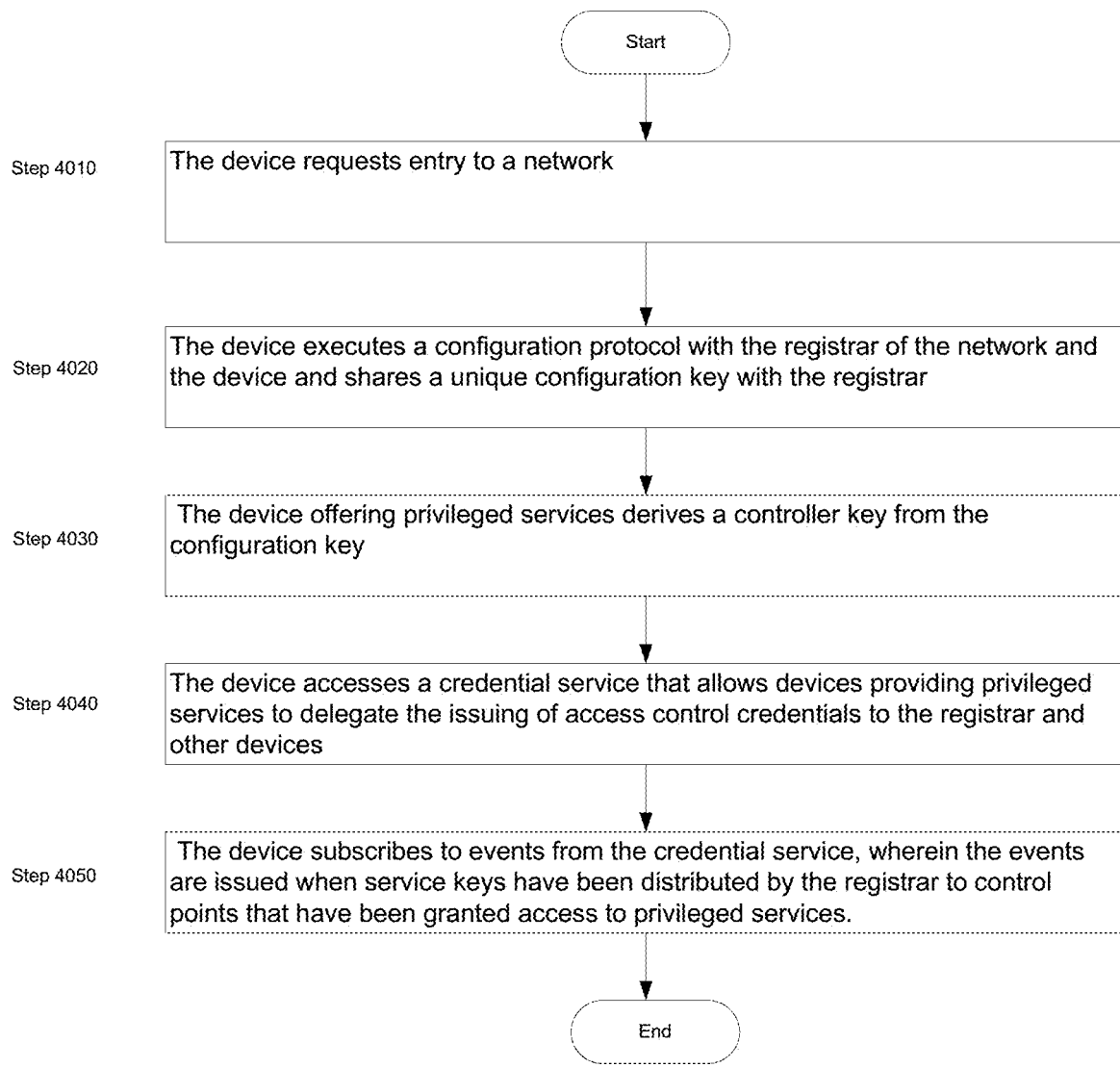
FIG. 4 illustrates steps implemented in an embodiment of the invention by a device.

FIG. 4 illustrates the steps implemented by a device on the network. In Step 4010, the device requests entry to a network. In Step 4020, the device executes a configuration protocol with the registrar of the network and the device and shares a unique configuration key with the registrar. If the device provides a privileged service, the configuration protocol enables the device to advertise the privileged service or if the device is a control point, the configuration protocol enables the device to advertise that it is able to control certain privileged services. In Step 4030, the device offering privileged services derives a controller key from the configuration key. In Step 4040, the device accesses a credential service that allows devices providing privileged services to delegate the issuing of access control credentials to the registrar and other devices. In Step 4050, the device subscribes to events from the credential service, wherein the events are issued when service keys have been distributed by the registrar to control points that have been granted access to privileged services.

It should be appreciated by one skilled in art, that the present invention may be utilized in any device that implemented on a Universal Plug and Play network described above. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An apparatus comprising at least one processor and at least one memory including computer program code, the at least one memory and the computer program code configured to, with the at least one processor, direct the apparatus at least to:
   execute a configuration protocol with a service device to establish first credentials for secure communications over a network between the apparatus and the service device;
   run a credential issuer service at the apparatus;
   receive, in a secure communication from the service device, an access to the credential issuer service that delegates, to the apparatus, the issuing of access control credentials to at least one control point device for a privileged service provided by the service device;
   then establish access control credentials with a control point device for the privileged service provided by the service device; and
   communicate, to the service device in a secure communication, the access control credentials established with the control point device for accessing the privileged service provided by the service device.

2. The apparatus of claim 1, wherein the executing of the configuration protocol enables the apparatus to advertise, over the network to other devices, the privileged service provided by the service device;
   and wherein the program code is configured to further direct the apparatus to:
   transmit, over the network to at least one other device, advertisement of the availability of the privileged service at the service device.

3. The apparatus of claim 1, wherein the program code is configured to further direct the apparatus to:
   establish second credentials between the apparatus and the service device, the second credentials for securing communications between the apparatus and the service device regarding the granting of access control credentials for accessing the privileged service provided by the service device.

4. The apparatus of claim 3, wherein the second credentials comprise a controller key derived from the first credentials.

5. The apparatus of claim 4, wherein the access control credentials established with the control point device for the privileged service provided by the service device comprise a service key; and
   wherein the secure communication communicating the access control credentials established with the control point device for accessing the privileged service provided by the service device comprises the service key secured with the controller key.

6. A method, comprising:

executing, at an apparatus coupled to a service device over a network, a configuration protocol with the service device to establish first credentials for secure communications over a network between the apparatus and the service device;

running a credential issuer service at the apparatus;

receiving, at the apparatus in a secure communication from the service device, an access to the credential issuer service that delegates, to the apparatus, the issuing of access control credentials to at least one control point device for a privileged service provided by the service device;

then establishing, at the apparatus, access control credentials with a control point device for the privileged service provided by the service device; and communicating, from the apparatus to the service device in a secure communication, the access control credentials established with the control point device for accessing the privileged service provided by the service device.

7. The method of claim 6, wherein the executing of the configuration protocol enables the apparatus to advertise, over the network to other devices, the privileged service provided by the service device;

and further comprising:

transmitting, from the apparatus over the network to at least one other device, advertisement of the availability of the privileged service at the service device.

8. The method of claim 6, further comprising:

establishing, at the apparatus and with the service device, second credentials for securing communications between the apparatus and the service device regarding the granting of access control credentials for accessing the privileged service provided by the service device.

9. The method of claim 8, wherein the second credentials comprise a controller key derived from the first credentials.

10. The method of claim 9, wherein the access control credentials established with the control point device for the privileged service provided by the service device comprise a service key; and wherein the secure communication communicating the access control credentials established with the control point device for accessing the privileged service provided by the service device comprises the service key secured with the controller key.

11. A method for performing a privileged service at a first device under the control of a second device, the first and second devices coupled over a network, comprising:

at the first device, executing a configuration protocol with a controller to establish first credentials for secure communications over a network between the first device and the controller;

transmitting a secure communication from the first device to the controller to grant authority delegating to the controller the issuing, to another device coupled over the network, of access control credentials for a privileged service provided by the first device;

receiving, at the first device in a secure communication, from the controller, access control credentials established with the second device for accessing the privileged service provided by the first device; and then, responsive to receiving a communication over the network comprising a request from the second device for the privileged service, the request secured with the access control credentials for the second device, performing the privileged service.

12. The method of claim 11, wherein the grant of authority to issue the access right comprises a grant of authority to advertise, over the network to other devices, the privileged service provided by the first device.

13. The method of claim 11, wherein the step of transmitting a secure communication delegating the issuing of access control credentials comprises:

advertising the privileged service provided by the first device to the controller; and establishing second credentials between the first device and the controller, the second credentials for securing communications between the first device and the controller regarding the granting of access control credentials for accessing the privileged service provided by the first device;

wherein the secured communication in which the first device receives, from the controller, access control credentials established with the second device is secured using the second credentials.

14. The method of claim 13, wherein the access control credentials established with the second device for accessing the privileged service provided by the first device comprise a service key established with the second device by the controller.

15. The method of claim 14, wherein the first credentials comprise a shared configuration key;

and wherein the second credentials comprise a controller key derived from the shared configuration key.

16. An apparatus for performing a privileged service under the control of another device, comprising at least one processor and at least one memory including computer program code, the at least one memory and the computer program code configured to, with the at least one processor, direct the apparatus at least to:

execute a configuration protocol with a controller to establish first credentials for secure communications over a network between the first device and the controller;

transmit a secure communication to the controller delegating to the controller the issuing, to a second device, of access control credentials for a privileged service provided by the apparatus;

receive, in a secure communication, from the controller, of access control credentials established with the second device for accessing the privileged service provided by the apparatus; and then, responsive to receiving a communication over the network comprising a request from the second device for the privileged service, the request secured with the access control credentials for the second device, perform the privileged service.

17. The apparatus of claim 16, wherein the grant of authority to issue the access right comprises a grant of authority to advertise, over the network to other devices, the privileged service provided by the apparatus.

18. The apparatus of claim 16, wherein the computer program code is configured to direct the apparatus to transmit the secure communication delegating the issuing of access control credentials to the controller by:

advertising, to the controller, the privileged service provided by the apparatus; and establishing second credentials with the controller, the second credentials for securing communications between the apparatus and the controller regarding the granting of access control credentials for accessing the privileged service;

wherein the secured communication in which the apparatus receives, from the controller, of access control credentials established with the second device is secured using the second credentials.

19. The apparatus of claim 18, wherein the access control credentials established with the second device for accessing the privileged service provided by the apparatus comprise a service key established with the second device by the controller.

20. The apparatus of claim 19, wherein the first credentials comprise a shared configuration key;

and wherein the second credentials comprise a controller key derived from the shared configuration key.

* * * * *